US010288111B2

(12) United States Patent
Delmotte et al.

(10) Patent No.: US 10,288,111 B2
(45) Date of Patent: May 14, 2019

(54) PISTON ROD ASSEMBLY

(71) Applicant: Dresser-Rand Company, Olean, NY (US)

(72) Inventors: Scott J. Delmotte, Mansfield, PA (US); Waldo E. Burdick, Jr., Horseheads, NY (US); Jonathan Kio, Corning, NY (US); Daniel Brackley, Painted Post, NY (US); Angus Andrews, Painted Post, NY (US); Malcolm J. Cliff, Painted Post, NY (US)

(73) Assignee: DRESSER-RAND COMPANY, Olean, NY (US)

( * ) Notice: Subject to any disclaimer, the term of this patent is extended or adjusted under 35 U.S.C. 154(b) by 212 days.

(21) Appl. No.: 15/438,991

(22) Filed: Feb. 22, 2017

(65) Prior Publication Data
US 2017/0284453 A1 Oct. 5, 2017

Related U.S. Application Data

(60) Provisional application No. 62/316,110, filed on Mar. 31, 2016.

(51) Int. Cl.
*F16C 5/00* (2006.01)
*F16J 1/12* (2006.01)
*F16J 1/16* (2006.01)
*F16C 17/02* (2006.01)

(52) U.S. Cl.
CPC ............... *F16C 5/00* (2013.01); *F16C 17/02* (2013.01); *F16J 1/12* (2013.01); *F16J 1/16* (2013.01)

(58) Field of Classification Search
CPC .............. F04B 39/0022; F04B 39/0094; F04B 53/146; F16C 5/00; F16J 1/10; F16J 1/12
See application file for complete search history.

(56) References Cited

U.S. PATENT DOCUMENTS

| 4,324,438 | A | * | 4/1982 | Lister | E21B 33/085 384/16 |
| 4,428,275 | A | * | 1/1984 | Huperz | F16B 2/14 403/287 |
| 5,031,512 | A | * | 7/1991 | Graziani | F16C 5/00 92/139 |
| 5,758,550 | A | * | 6/1998 | Lenczyk | F16C 7/023 74/579 E |
| 7,530,756 | B2 | * | 5/2009 | Graziani | F04B 39/0022 123/66 |

(Continued)

FOREIGN PATENT DOCUMENTS

DE          10048701 C1 *  6/2002   ......... F04B 39/0022

*Primary Examiner* — Michael Leslie
*Assistant Examiner* — Matthew Wiblin

(57) ABSTRACT

A piston rod assembly for a reciprocating compressor. The piston rod assembly may include a piston rod having a longitudinal axis and forming a piston rod neck and a piston rod shoulder. The piston rod may include a first end integral or coupled with a piston head and a second end axially opposing the first end and configured to couple with a crosshead including a flange. An inner surface of the flange may have a Brinell hardness. The piston rod assembly may also include a cylindrical sleeve disposed circumferentially about the piston rod neck. The cylindrical sleeve may have a lower Brinell hardness than the Brinell hardness of the inner surface of the flange.

15 Claims, 6 Drawing Sheets

(56) References Cited

U.S. PATENT DOCUMENTS

| | | | |
|---|---|---|---|
| 2006/0266964 A1* | 11/2006 | Farley | F16L 37/23 |
| | | | 251/82 |
| 2014/0251604 A1* | 9/2014 | Jaramillo | E21B 49/081 |
| | | | 166/264 |
| 2017/0122301 A1* | 5/2017 | Brogle | F16J 7/00 |

* cited by examiner

PISTON ROD ASSEMBLY

CROSS-REFERENCE TO RELATED APPLICATIONS

This application claims the benefit of U.S. Provisional Patent Application having Ser. No. 62/316,110, which was filed Mar. 31, 2016. The aforementioned patent application is hereby incorporated by reference in its entirety into the present application to the extent consistent with the present application.

BACKGROUND

Reciprocating compressors generally utilize the rectilinear motion of a piston within a cylinder to compress a working fluid. The rectilinear motion may be provided by the connection of the piston to a crankshaft via a connecting rod. In forming the connection, the crankshaft may be connected to the connecting rod via a crankpin. However, as arranged, sideways forces from the connecting rod may be transmitted directly to the piston, as the crankpin moves from side to side with the rotary motion of the crankshaft.

In large reciprocating compressors, these constant sideways forces result in an increase in overall friction and an undesirable amount of wear on the piston and cylinder. Accordingly, in an effort to decouple the transverse movement of the crankpin from the axial movement of the piston, those of skill in the art typically employ a crosshead-piston rod assembly. In such an assembly, a crosshead links a piston rod (a component of the piston) with the connecting rod. Thus, the sideways forces transmitted by the connecting rod are absorbed by the crosshead, which allows the piston rod to move along a longitudinal axis thereof with negligible transverse load.

To carry out the foregoing, the crosshead may be linked or coupled to the piston rod in various manners. For example, the crosshead may include a flange attached to an axial end of a main body of the crosshead. A neck of the piston rod may be inserted into a bore defined by an inner surface of the flange, such that a threaded end of the piston rod may extend from the bore and a shoulder of the piston rod may contact the surface of the flange. A piston rod nut may be threaded onto the threaded end of the piston rod, thus securing the flange to the piston rod. The flange may then be bolted to the main body of the crosshead, thus coupling the crosshead and the piston rod.

The piston rod neck may form one or more lands extending radially outward and configured to maintain alignment between the piston rod and the inner surface of the flange. During normal operation of the piston, axial and radial loads may cause a concentration of stress in the zone between the piston rod neck and shoulder and may also cause contact between the lands and the inner surface of the flange, thereby causing fretting and weakening of the piston rod. Accordingly, a proposed solution to the fretting has been the coating of the lands with a fretting resistant coating; however, certain drawbacks have been associated with this proposed solution. For instance, the application of the fretting resistant coating may result in increased expense and production time, as the coating typically must be applied at a third party facility after production of the piston rod, thereby leading to longer lead times for customers and greater potential for damage to the piston rod during shipping to and from the third party facility.

What is needed, therefore, is a facile and inexpensive manner of aligning and maintaining alignment of the piston rod with the flange in a crosshead-piston rod assembly while substantially reducing or eliminating fretting at the interface of the piston rod and flange.

SUMMARY

Embodiments of the disclosure may provide a piston rod assembly for a reciprocating compressor. The piston rod assembly may include a piston rod having a longitudinal axis and forming a piston rod neck and a piston rod shoulder. The piston rod may include a first end integral or coupled with a piston head and a second end axially opposing the first end and configured to couple with a crosshead including a flange. An inner surface of the flange may have a Brinell hardness. The piston rod assembly may also include a cylindrical sleeve disposed circumferentially about the piston rod neck. The cylindrical sleeve may have a lower Brinell hardness than the Brinell hardness of the inner surface of the flange.

Embodiments of the disclosure may further provide a crosshead-piston rod assembly. The crosshead-piston rod assembly may include a piston rod having a longitudinal axis and forming a piston rod neck and a piston rod shoulder. The piston rod may include a first end integral or coupled with a piston head and a second end axially opposing the first end. The crosshead-piston rod assembly may also include a crosshead. The crosshead may include a main body portion defining a cavity and having a first end portion and a second end portion axially opposing the first end portion. The second end portion may define an opening through which a connecting rod extends from the cavity. The crosshead may also include a flange having an inner surface defining a bore through which the second end of the piston rod and the piston rod neck extends. The flange may be coupled with the first end portion of the main body portion, and the inner surface may be formed from a first material having a Brinell hardness. The crosshead-piston rod assembly may further include a cylindrical sleeve disposed circumferentially about the piston rod neck. The cylindrical sleeve may be formed from a second material having a lower Brinell hardness than the first material of the inner surface of the flange having a Brinell hardness.

Embodiments of the disclosure may further provide a method for manufacturing a piston rod assembly. The method may include forming a piston rod extending longitudinally along a longitudinal axis from a first axial end portion to a second axial end portion. The first axial end portion may be integral or coupled with a piston head. The piston rod may form a piston rod neck and a piston rod shoulder adjacent the second axial end portion. The method may also include disposing a cylindrical sleeve circumferentially about the piston rod neck.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
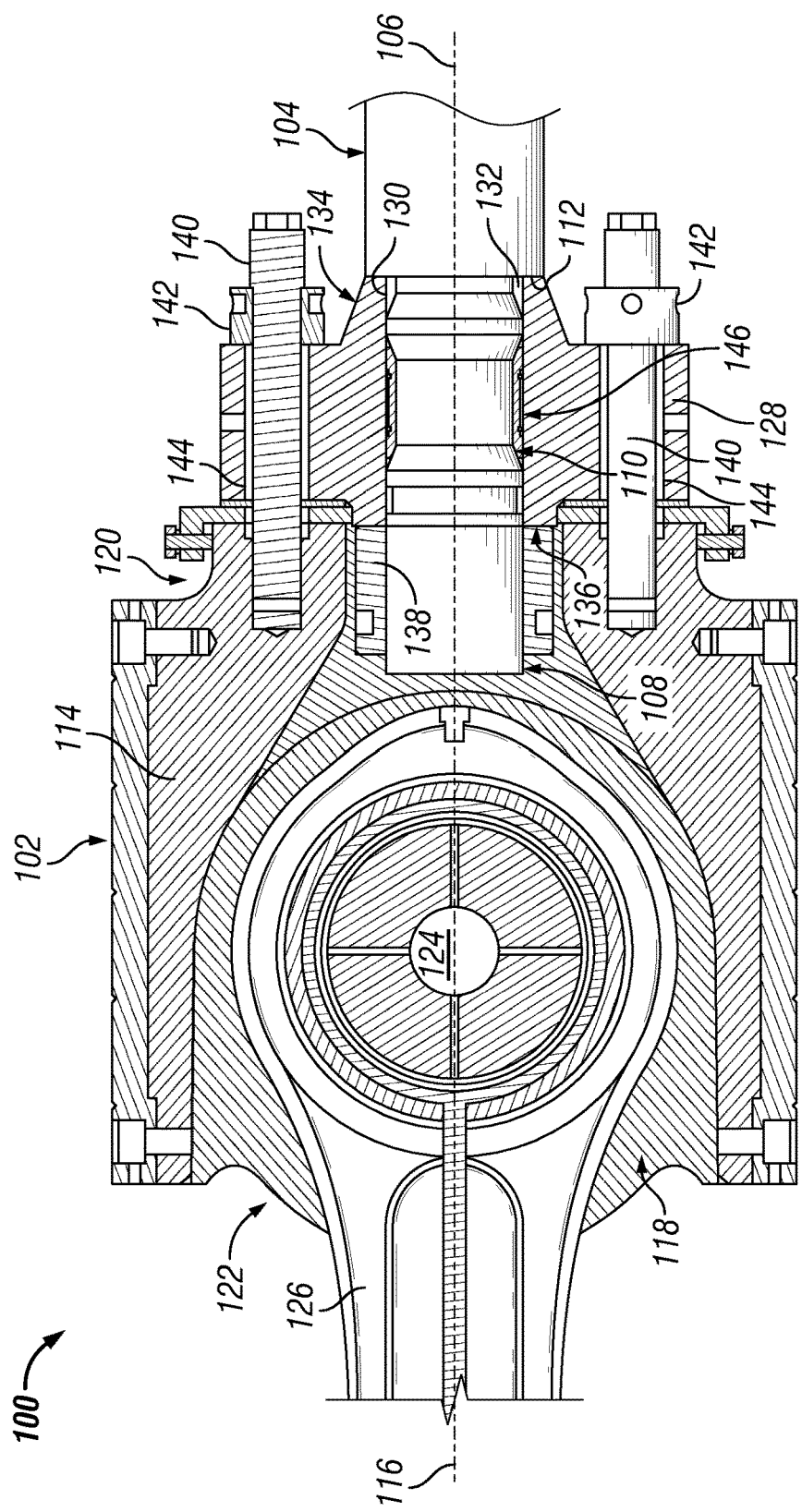
FIG. 1 illustrates a cross section view of a crosshead-piston rod assembly, according to one or more embodiments.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

As used herein, the term "substantially reduce" means to reduce to a measurable extent.

One or more example embodiments disclosed herein provide a crosshead-piston rod assembly for aligning a piston rod coupled with a rotary device. In one or more example embodiments disclosed herein, a crosshead-piston rod assembly may be utilized to align a piston rod of a reciprocating compressor with a flange of a crosshead-piston rod assembly. In one or more example embodiments disclosed herein, a crosshead-piston rod assembly may provide for the alignment of a piston rod of a reciprocating compressor with a flange of a crosshead while substantially reducing or eliminating fretting of the flange and the piston rod at the interface thereof.

FIG. 1 illustrates a cross section view of a crosshead-piston rod assembly 100, according to one or more embodiments. The crosshead-piston rod assembly 100 may include a crosshead 102 and a piston rod 104. The piston rod 104 may be a component of a piston, where the piston further includes a piston head (not shown) coupled with or integral with the piston rod 104. The piston rod 104 may provide the piston head with a reciprocating motion within a cylinder (not shown) of a reciprocating compressor, such as an API 618 Process Reciprocating Compressor, manufactured by Dresser-Rand of Houston, Tex. The reciprocating motion of the piston head may compress a working fluid introduced in the cylinder, thereby provided compressed working fluid to other process machinery for use in refining, gas transmission and storage, gas injection, and the like. Illustrative working fluids may include, but are not limited to, hydrogen, carbon dioxide, methane, ethylene, or mixtures of hydrocarbons.

The piston may have a longitudinal axis 106, such that the piston rod 104 extends along the longitudinal axis 106 terminating in the piston head at one end portion (not shown) and a connecting end 108 at the other end portion, where the connecting end 108 is configured to couple with the crosshead 102. The piston rod 104 may further form a piston rod neck 110 bounded at one axial end by the connection end 108 and a shoulder 112 of the piston rod 104 at the other axial end. In operation, the piston translates along the longitudinal axis 106 in order to move the piston head in the cylinder in a reciprocating motion to compress the working fluid. In an exemplary embodiment, the piston may be a monolithic piece and may be constructed from die-forged steel.

The crosshead 102 may have a main body 114 having a longitudinal axis 116 extending along the axial length of the main body 114. In an exemplary embodiment, the longitudinal axis 116 of the main body 114 may be coaxial with the longitudinal axis 106 of the piston rod 104. The main body 114 may define a bore 118 extending therethrough along the longitudinal axis 116 from a first axial end 120 of the main body 114 to a second axial end 122 of the main body 114. A crosshead pin 124 may be inserted through the bore 118 transversely in relation to the longitudinal axis 116, thereby coupling one end of a connecting rod 126 to the crosshead-piston rod assembly 100. The connecting rod 126 may extend from the second axial end 122 of the main body 114, such that the other end (not shown) of the connecting rod 126 may be operatively coupled with a crankshaft (not shown).

The crankshaft may be operatively coupled to a drive shaft (not shown) of a driver (not shown). The driver may be configured to provide the crankshaft with rotational energy, which may be translated to the reciprocating motion utilized to drive the piston and the reciprocating compressor. In an exemplary embodiment, the drive shaft may be integral with or coupled with the crankshaft, such that the rotational energy of the drive shaft is imparted to the crankshaft. The drive shaft may be coupled with the crankshaft via a gearbox (not shown) including a plurality of gears configured to transmit the rotational energy of the drive shaft to the crankshaft, such that the drive shaft and the crankshaft may spin at the same speed, substantially similar speeds, or differing speeds and rotational directions.

The driver may be a motor and more specifically may be an electric motor, such as a permanent magnet motor, and may include a stator (not shown) and a rotor (not shown). It will be appreciated, however, that other embodiments may employ other types of electric motors including, but not limited to, synchronous motors, induction motors, and brushed DC motors. The driver may also be a hydraulic motor, an internal combustion engine, a steam turbine, a gas turbine, or any other device capable of driving the crankshaft eitherdirectly or through a power train.

The crosshead 102 may include a flange 128 formed from a steel alloy, such as, for example, ASTM A193 grade B7 alloy steel. An inner surface 130 of the flange 128 may define a bore 132 through which the connecting end 108 and the piston rod neck 110 of the piston rod 104 may extend, such that the shoulder 112 of the piston rod 104 abuts and contacts a surface of an axial end 134 of the flange 128. As arranged, the connecting end 108 of the piston rod 104 may extend from the opposing axial end 136 of the flange 128 and into a piston rod nut 138 disposed or disposable in the bore 118 of the crosshead 102. The piston rod nut 138 may be a hydraulic nut, and the piston rod nut 138 may be hydraulically secured to the connecting end 108, such that the piston rod 104 may be secured to the flange 128. In an exemplary embodiment, as secured to the piston rod 104, the flange 128 may be coupled to the first axial end 120 of the main body 114 via a fastening assembly. As illustrated in FIG. 1, the fastening assembly may include a plurality of fastening members, such as, for example, studs 140 formed from ISTM A193 grade B7 alloy steel and utilized in conjunction with corresponding hydraulic nuts 142. The flange 128 may define a plurality of attachment apertures 144 (more clearly seen in FIG. 2A), such that the flange 128 may be coupled to the main body 114 via the insertion of the studs 140 into the respective attachment apertures 144 and the hydraulic tensioning of the studs 140 with the respective hydraulic nuts 142.

Figure 2A:
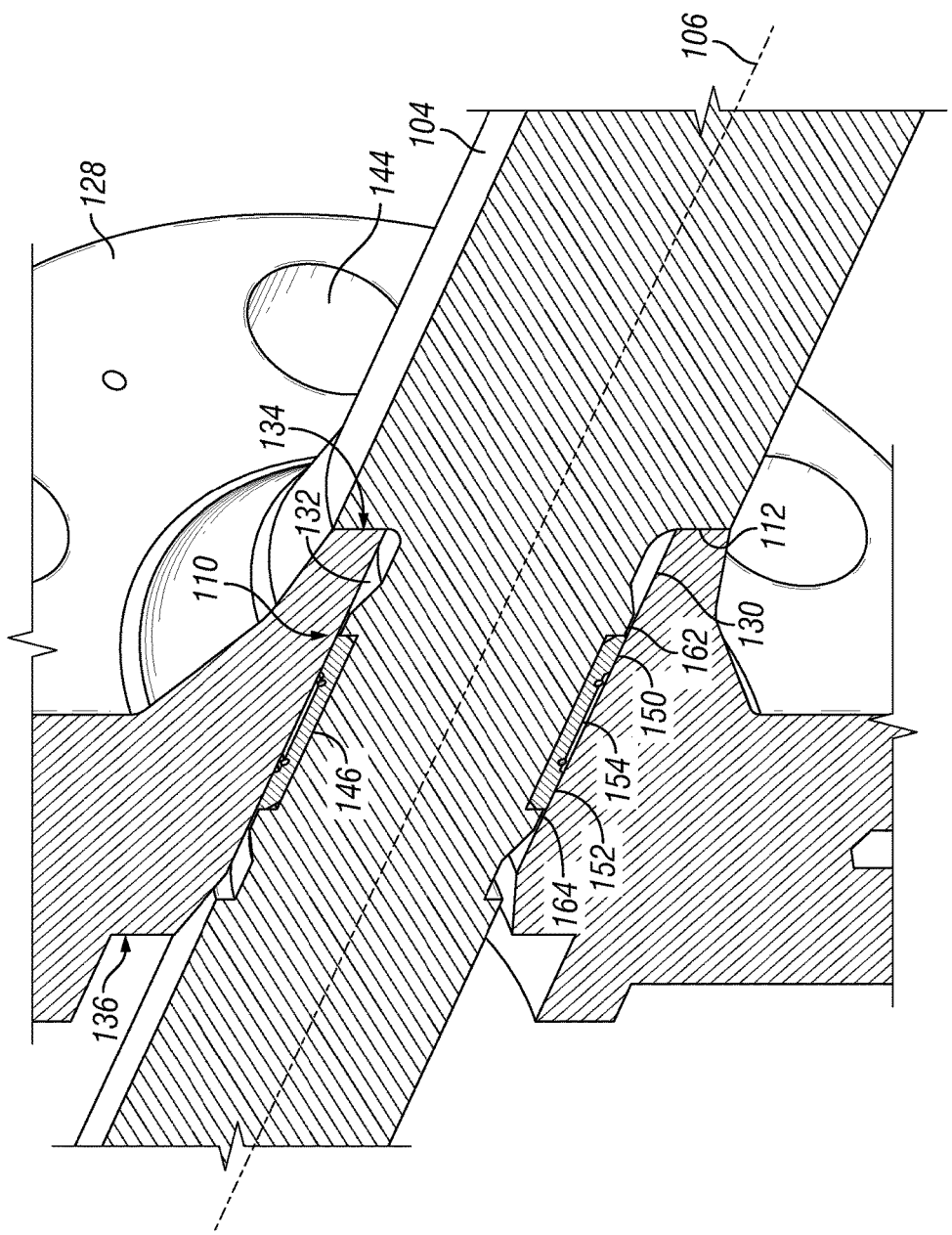
FIG. 2A illustrates a partial cross section view of a cylindrical sleeve disposed circumferentially about a piston rod neck, where the piston rod neck is disposed within a flange, according to one or more embodiments.
Figure 2B:
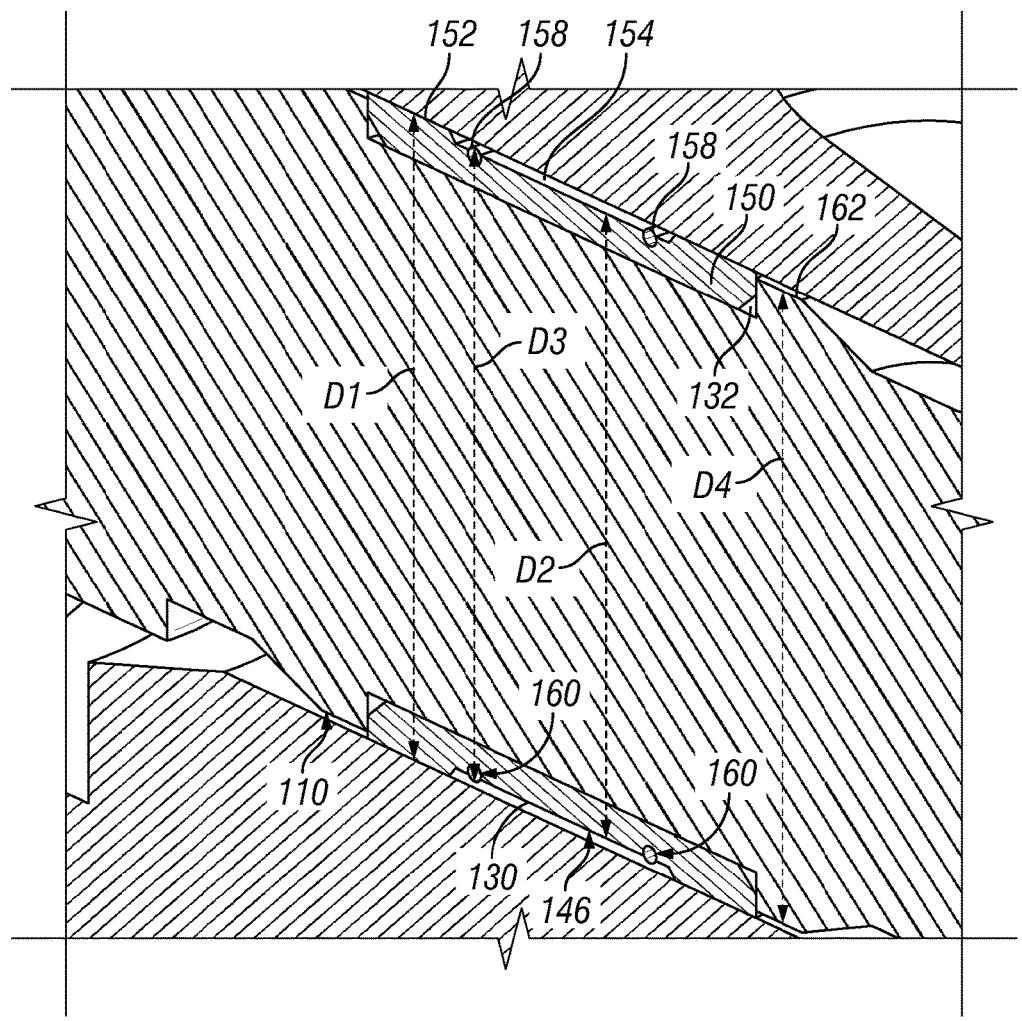
FIG. 2B illustrates an enlarged view of a portion of FIG. 2A including the cylindrical sleeve disposed circumferentially about the piston rod neck, where the piston rod neck is disposed within the flange, according to one or more embodiments.
Figure 3:
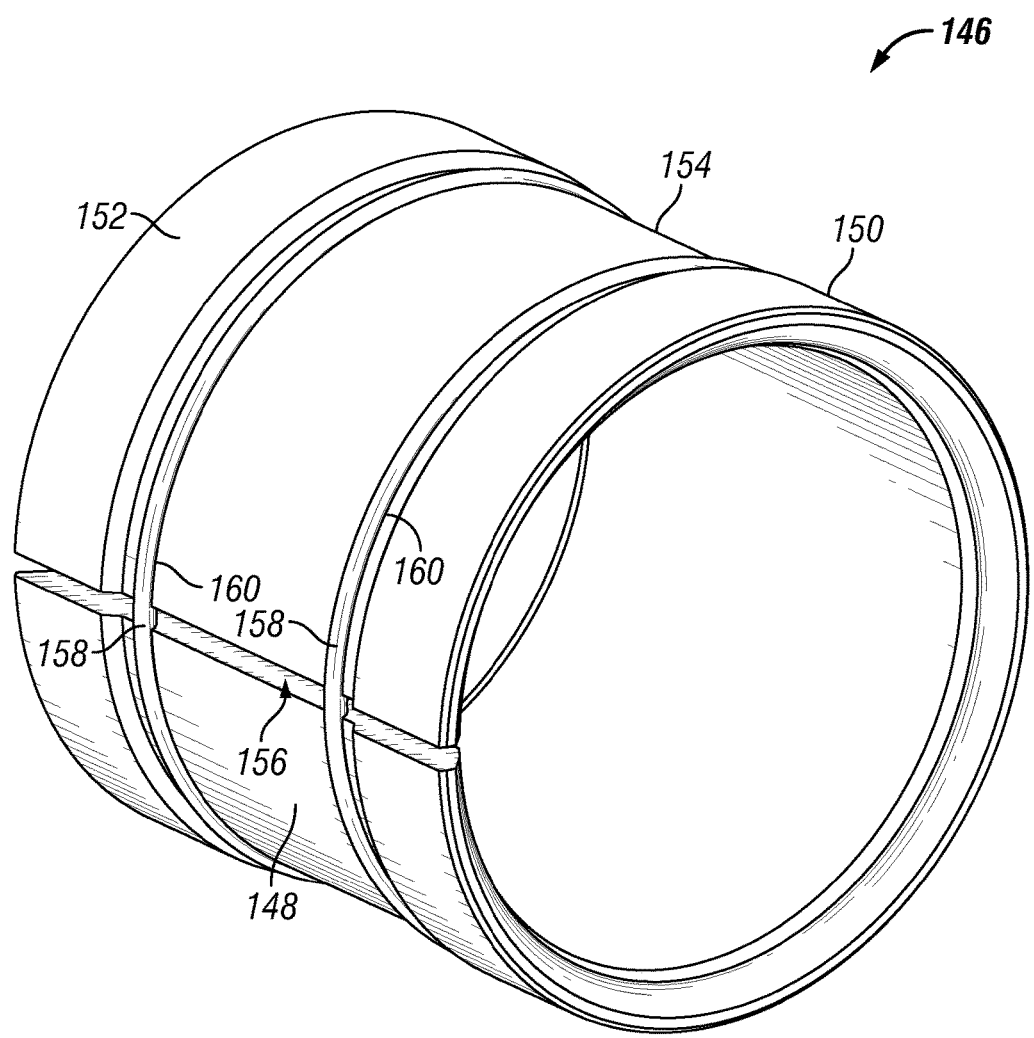
FIG. 3 illustrates a perspective view of the cylindrical sleeve of FIG. 2A and 2B, according to one or more embodiments.
Figure 4:
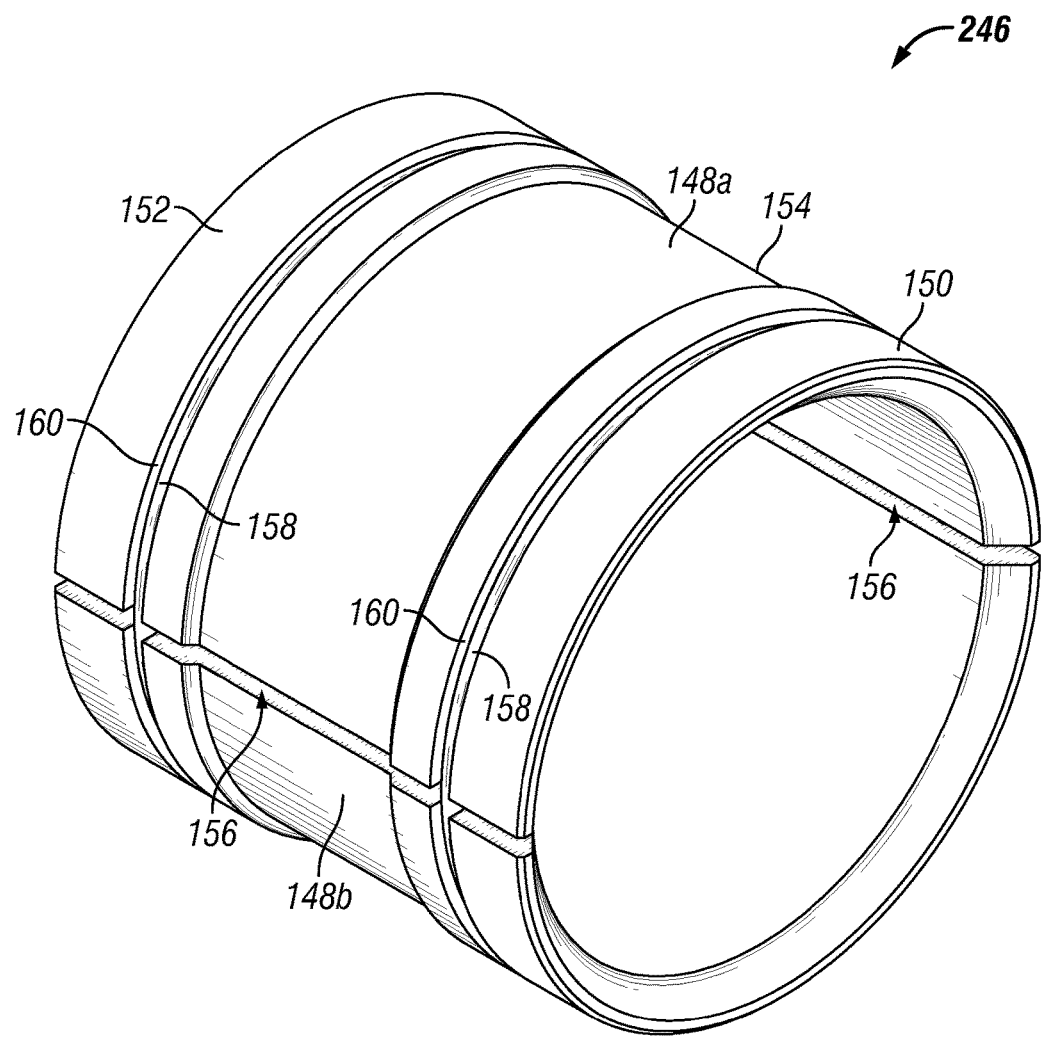
FIG. 4 illustrates a perspective view of another cylindrical sleeve, according to one or more embodiments.

As illustrated in FIG. 1, and shown more clearly in FIGS. 2A, 2B, 3, and 4, the crosshead-piston rod assembly 100 may include a cylindrical sleeve 146 (246 in FIG. 4) disposed circumferentially about the piston rod neck 110 of the piston rod and configured to substantially reduce or eliminate fretting at the interface of the piston rod neck 110 and the flange 128. FIG. 2A illustrates a partial cross section view of the cylindrical sleeve 146 disposed circumferentially about and mounted to the piston rod neck 110, where the piston rod neck 110 is disposed within the flange 128, according to one or more embodiments. FIG. 2B illustrates an enlarged view of a portion of FIG. 2A including the cylindrical sleeve 146 disposed circumferentially about the piston rod neck 110, where the piston rod neck 110 is disposed within the flange 128, according to one or more embodiments. FIG. 3 illustrates a perspective view of the cylindrical sleeve 146 of FIGS. 1, 2A, and 2B, according to one or more embodiments, and FIG. 4 illustrates a perspective view of another cylindrical sleeve 246 that may be utilized in the crosshead-piston rod assembly 100 of FIG. 1, according to one or more embodiments.

Each of the cylindrical sleeves 146, 246 may have a cylindrical sidewall 148 (148a, 148b in FIG. 4) having an axial length and including a first flanged end portion 150 and a second flanged end portion 152 axially opposing the first flanged end portion 150. The cylindrical sidewall 148 (148a, 148b in FIG. 4) may further include an axially extending center portion 154 disposed between the first and second flanged end portions 150,152. The first flanged end portion 150 and the second flanged end portion 152 may each have an outer diameter ($D_1$) greater than an outer diameter $D_2$ of the axially extending center portion 154, as shown most clearly in FIG. 2B.

The cylindrical sidewall 148 may be a single, monolithic piece as illustrated in FIG. 3, or in other embodiments, the cylindrical sidewall may be formed from a plurality of semi-cylindrical sidewalls 148a, 148b. For example, in one embodiment illustrated in FIG. 4, the cylindrical sleeve 246 may be formed from a first semi-cylindrical sidewall 148a and a second semi-cylindrical sidewall 148b, where each semi-cylindrical sidewall 148a, 148b forms half of the cylindrical sleeve 246. In another embodiment, the cylindrical sleeve 246 may be formed from three or more semi-cylindrical sidewalls.

The cylindrical sleeve 146, 246 may be disposed circumferentially about an outer surface of the piston rod neck 110 and coupled to the piston rod neck 110, according to one or more embodiments. As illustrated in FIG. 3, the cylindrical sleeve 146 may define an axially extending slit 156. The axially extending slit 156 may extend from the first flanged end portion 150 of the cylindrical sleeve 146 to the second flanged portion 152 of the cylindrical sleeve 146. Accordingly, in one embodiment, to couple the cylindrical sleeve 146 to the piston rod neck 110, a force may be applied to the cylindrical sleeve 146 to widen the axially extending slit 156 such that the piston rod neck 110 may be inserted into the cylindrical sleeve 146. The force may be removed from the cylindrical sleeve 146, thereby restoring the original configuration of the axially extending slit 156. In such a coupling, the cylindrical sleeve 146 is coupled to the piston rod neck 110 via the tension of the cylindrical sleeve 146.

In one or more embodiments, the cylindrical sleeve 146, 246 may be coupled with the piston rod neck 110 via one or more annular members 158. The one or more annular members 158 may be configured to retain the cylindrical sleeve 146 at a fixed location about the piston rod neck 110, where the cylindrical sidewall 148 is a single, monolithic piece as illustrated in FIG. 3, or in other embodiments, where the cylindrical sleeve 246 may be formed from a plurality of semi-cylindrical sidewalls 148a, 148b, as illustrated in FIG. 4. In addition to or in place of retaining the cylindrical sleeve 246 in a fixed location about the piston rod neck 110, the annular members 158 may be configured to couple the plurality of semi-cylindrical sidewalls 148a, 148b to one another about the piston rod neck 110. The one or more annular members 158 may be annular bands formed from one or more polymers, such as a plastic or rubber. In another embodiment, the one or more annular members may be solid wire springs or garter springs manufactured by Stanley Springs & Stamping Corporation of Chicago, Ill.

As illustrated in FIG. 4, each of the first flanged portion 150 and the second flanged portion 152 may define an annular groove 160 in which respective annular members 158 may be disposed, and as such, configured to couple the cylindrical sleeve 246 to the piston rod neck 110. As disposed in the respective annular grooves 160, the annular members 158 are recessed therein and thus do not extend radially from an outer surface of the cylindrical sleeve 246. In another embodiment, the axially extending center portion 154 of the cylindrical sleeve 146 may define one or more grooves 160 (two shown in FIG. 3) in which respective annular members 158 may be disposed, and as such, configured to couple the cylindrical sleeve 146 to the piston rod neck 110. As illustrated in FIG. 3, the annular members 158 are partially recessed in the respective annular grooves 160, such that the outer diameter $D_3$ of the annular members 158 as disposed in the respective annular grooves 160 is less than the outer diameters $D_1$ of the first and second flanged end portions 150, 152.

As most clearly illustrated in FIGS. 1, 2A, and 2B, the piston rod neck 110 may further form a plurality of lands 162, 164 extending radially outward from the longitudinal axis 106 and configured to prevent axial movement of the cylindrical sleeve.146, 246 along the longitudinal axis 106 of the piston rod 104. The plurality of lands 162, 164 may include a first land 162 and a second land 164 axially spaced from one another a distance approximately equal to the axial length of the cylindrical sleeve 146, 246. Each of the first and second lands 162, 164 has a respective outer diameter $D_4$, where the outer diameters $D_4$ of the first and second lands 162, 164 are less than the outer diameters $D_1$ of the first and second flanged end portions 150, 152. In another embodiment, the cylindrical sleeve 146, 246 may be free floating, such that the axial movement of the cylindrical sleeve 146, 246 may only be inhibited by the manner of coupling the cylindrical sleeve 146, 246 to the piston rod neck 110.

In an exemplary embodiment, the cylindrical sleeve 146, 246 may be formed from a non-fretting material, such that fretting between the piston rod neck and the flange is substantially reduced or eliminated. For example, the cylindrical sleeve may be formed from bronze. In another example, the cylindrical sleeve may be formed from a non-ferrous metal, such as aluminum. In another example, the cylindrical sleeve may be formed from a non-metallic element. In another example, the cylindrical sleeve may be formed from a polymer, such as a plastic or rubber. In another embodiment, the cylindrical sleeve may be formed from a material having a lower Brinell hardness than the Brinell hardness of the inner surface of the flange. The differential in the Brinell hardness may be determined based on the materials used and the knowledge of those of skill in the art.

With continued reference to FIGS. 1-4, an exemplary operation of one or more embodiments is provided. In the exemplary operation, the piston rod assembly is constructed and coupled with the crosshead 102 to form the crosshead-piston rod assembly 100 for use in a reciprocating compressor. The piston rod assembly includes the piston rod 104 and the cylinder sleeve 146, 246 coupled with the piston rod 104. To form the piston rod assembly, a piston is provided including the piston rod 104 terminating at one end portion in the piston head (not shown) and in the connecting end 108 at the axially opposing end portion. The piston rod 104 may further form the piston rod neck 110 bounded at one axial end by the connection end 108 and the shoulder 112 of the piston rod 104 at the other axial end.

The cylindrical sleeve 146, 246 may be circumferentially disposed about the piston rod neck 110 and coupled thereto via the opening and closing of the axially extending slit 156 (illustrated in FIG. 3) defined in the cylindrical sidewall 148 or the joining of the first semi-cylindrical sidewall 148a and a second semi-cylindrical sidewall 148b (illustrated in FIG. 4). The annular members 158 may be disposed within respective annular grooves 160 defined in the cylindrical sidewalls (148 or 148a, 148b), thereby coupling the cylindrical sleeve 146, 246 to the piston rod neck 110. The cylindrical sleeve 146, 246 may be disposed between axially spaced first and second lands 162, 164, where the outer diameters $D_4$ of the first and second lands 162, 164 is less than the outer diameters $D_1$ of the first and second flanged end portions 150, 152 of the cylindrical sleeve 146, 246.

In the exemplary operation thereof, the cylindrical sleeve 146, 246 may be formed from a non-fretting material, such as bronze. The piston rod assembly including the piston rod 104 and the cylindrical sleeve 146, 246 coupled thereto may be coupled to a crosshead 102 via a flange 128 to form a crosshead-piston rod assembly 100. The piston rod neck 110 and the connecting end 108 may be inserted through the bore 132 defined by the inner surface 130 of the flange 128, such that the shoulder 112 of the piston rod 104 abuts and contacts a surface of the axial end 134 of the flange 128. As arranged, the connecting end 108 of the piston rod 104 may extend from the opposing axial end 136 of the flange 128 and into a piston rod nut 138 disposed in the bore 118 of the main body 114 of the crosshead 102. The piston rod nut 138 may be a hydraulic nut, and the piston rod nut 138 may be secured to the connecting end 108, such that the piston rod 104 may be secured to the flange 128. The flange 128 may be coupled to the first axial end 120 of the main body 114 of the crosshead 102 via a plurality of fastening members, such as, for example, the studs 140 utilized in conjunction with the corresponding hydraulic nuts 142. The flange 128 may define the plurality of attachment apertures 144 (more clearly seen in FIG. 2A), such that the flange 128 may be coupled to the main body 114 via the insertion of the studs 140 into the respective attachment apertures 144 and the hydraulic tensioning of the studs 140 with the respective hydraulic nuts 142.

As disposed in the bore 132 of the flange 128, the cylindrical sleeve 146, 246 may provide for the radial alignment of the piston rod neck 110 and the flange 128 of the crosshead-piston rod assembly 100. The outer diameters $D_1$ of the first and second flanged end portions 150, 152 may be greater than the outer diameters $D_4$ of the first and second lands 162, 164, such that the cylindrical sleeve 146, 246 may contact the inner surface 130 of the flange 128. As the cylinder sleeve 146, 246 is formed from a non-fretting material, such as, for example, bronze, fretting between the piston rod neck 110 and the inner surface 130 of the flange 128 at the interface thereof is substantially reduced or eliminated. In the event, the outer surface of the cylindrical sleeve 146, 246 exhibits excessive wear from contact with the inner surface 130 of the flange 128, the cylindrical sleeve 146, 246 may be de-coupled from the piston rod 104 and a replacement cylindrical sleeve 146, 246 may be then be coupled to the piston rod 104.

Figure 5:
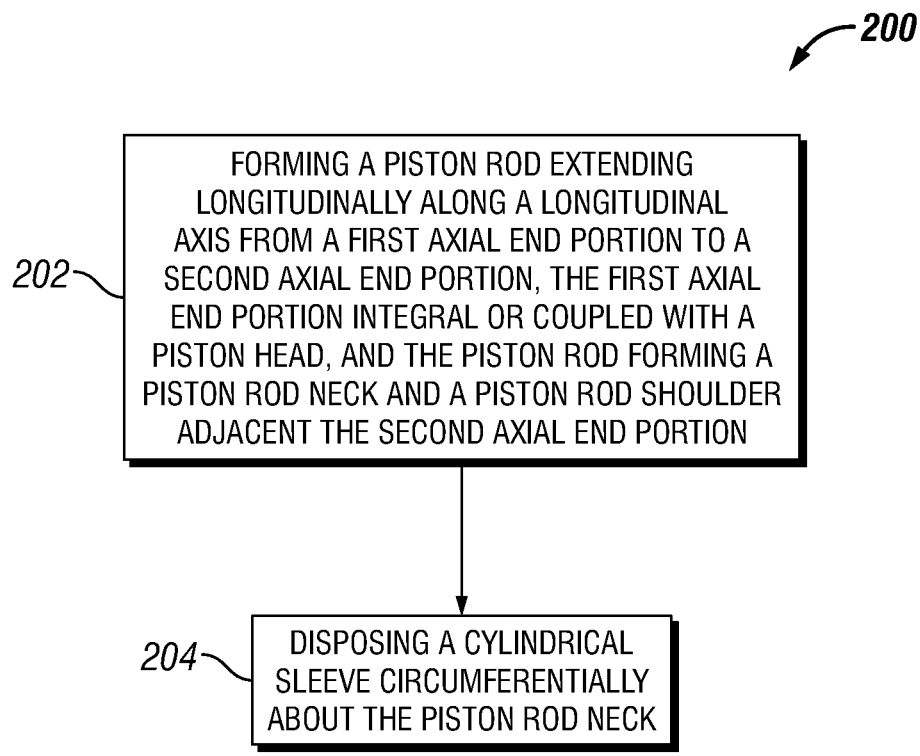
FIG. 5 is a flowchart depicting a method for manufacturing a piston rod assembly, according to one or more embodiments.

FIG. 5 is a flowchart depicting a method 200 for manufacturing a piston rod assembly, according to one or more embodiments. The method 200 may include forming a piston rod extending longitudinally along a longitudinal axis from a first axial end portion to a second axial end portion, the first axial end portion integral or coupled with a piston head, and the piston rod forming a piston rod neck and a piston rod shoulder adjacent the second axial end portion, as at 202. The method 200 may also include disposing a cylindrical sleeve circumferentially about the piston rod neck, as at 204.

In an embodiment, the method 200 may further include forming an axially extending slit in a cylindrical sidewall of the cylindrical sleeve, the axially extending slit extending from a first axial end portion of the cylindrical sleeve to a second axial end portion of the cylindrical sleeve. In an embodiment, the method 200 may also include retaining the cylindrical sleeve in a fixed location circumferentially about the piston rod neck via one or more annular members disposed circumferentially about the cylindrical sidewall of the cylindrical sleeve. In an embodiment, the method 200 may further include forming a first annular land adjacent a first end of the piston rod neck and a second annular land adjacent a second end of the piston rod neck, the second end of the piston rod neck axially opposing the first end of the piston rod neck; disposing the cylindrical sleeve circumferentially about the piston rod neck between the first annular land and the second annular land; and retaining the cylindrical sleeve in a fixed axial location via the first annular land and the second annular land. The outer diameter of one or more portions of the cylindrical sleeve is greater than each of the outer diameter of the first annular land and the outer diameter of the second annular land.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A piston rod assembly for a reciprocating compressor, comprising:
   a piston rod having a longitudinal axis and forming a piston rod neck and a piston rod shoulder, the piston rod comprising a first end integral or coupled with a piston head and a second end axially opposing the first end and configured to couple with a crosshead comprising a flange, an inner surface of the flange having a Brinell hardness, the cross head further comprising a main body portion defining a cavity and having a first end portion and a second end portion axially opposing the end portion, the second end portion defining an opening through which a connecting rod extends from the cavity; and
   a cylindrical sleeve disposed circumferentially about the piston rod neck, the cylindrical sleeve having a lower Brinell hardness than the Brinell hardness of the inner surface of the flange,
   wherein:
   the piston rod neck is disposed between the second end of the piston rod and the piston rod shoulder, the second end of the piston rod is coupled with the flange via a hydraulic nut, and the piston shoulder abuts an axial end portion of the flange; and
   the flange defines a plurality of attachment apertures, and the flange is coupled with the first end portion of the main body portion via a plurality of fastening members, each fastening member being disposed within a respective attachment aperture of the plurality of attachment apertures.

2. The piston rod assembly of claim 1, wherein:
   the piston rod forms a first annular land adjacent a first end of the piston rod neck and a second annular land adjacent a second end of the piston rod neck, the second end of the piston rod neck axially opposing the first end of the piston rod neck;
   the cylindrical sleeve is disposed between the first annular land and the second annular land; and
   the outer diameter of the cylindrical sleeve is greater than each of the outer diameter of the first annular land and the outer diameter of the second annular land.

3. The piston rod assembly of claim 1, wherein the cylindrical sleeve comprises a cylindrical sidewall defining an axially extending slit, the axially extending slit extending from a first axial end portion of the cylindrical sleeve to a second axial end portion of the cylindrical sleeve.

4. The piston rod assembly of claim 3, further comprising one or more annular members disposed circumferentially about the cylindrical sidewall and configured to retain the cylindrical sleeve at a fixed location about the piston rod neck.

5. The piston rod assembly of claim 4, wherein the one or more annular members comprises a garter spring.

6. The piston rod assembly of claim 1, wherein the cylindrical sleeve is formed from a first semi-cylindrical sidewall portion and a second semi-cylindrical sidewall portion.

7. The piston rod assembly of claim 6, wherein the cylindrical sleeve is formed from bronze.

8. The piston rod assembly of claim 1, wherein the cylindrical sleeve comprises a flanged first axial end portion and a flanged second axial end portion.

9. A crosshead-piston rod assembly, comprising:
   a piston rod having a longitudinal axis and forming a piston rod neck and a piston rod shoulder, the piston rod comprising a first end integral or coupled with a piston head and a second end axially opposing the first end;
   a crosshead comprising
      a main body portion defining a cavity and having a first end portion and a second end portion axially opposing the first end portion, the second end portion defining an opening through which a connecting rod extends from the cavity;
      a flange having an inner surface defining a bore through which the second end of the piston rod and the piston rod neck extends, the flange coupled with the first end portion of the main body portion, and the inner surface formed from a first material having a Brinell hardness; and
      a cylindrical sleeve disposed circumferentially about the piston rod neck, the cylindrical sleeve formed from a second material having a lower Brinell hardness than the first material of the inner surface of the flange having a Brinell hardness,
   wherein:
   the piston rod neck is disposed between the second end of the piston rod and the piston rod shoulder, the second end of the piston rod is coupled with the flange via a hydraulic nut, and the piston shoulder abuts an axial end portion of the flange; and
   the flange defines a plurality of attachment apertures, and the flange is coupled with the first end portion of the main body portion via a plurality of fastening members, each fastening member being disposed within a respective attachment aperture of the plurality of attachment apertures.

10. The crosshead-piston rod assembly of claim 9, wherein the first material of the inner surface of the flange is steel, and the second material of the cylindrical sleeve is bronze.

11. The crosshead-piston rod assembly of claim 9, wherein:
    the piston rod forms a first annular land adjacent a first end of the piston rod neck and a second annular land adjacent a second end of the piston rod neck, the second end of the piston rod neck axially opposing the first end of the piston rod neck;

the cylindrical sleeve is disposed between the first annular land and the second annular land; and the outer diameter of the cylindrical sleeve is greater than each of the outer diameter of the first annular land and the outer diameter of the second annular land.

12. The crosshead-piston rod assembly of claim 11, wherein the cylindrical sleeve comprises a cylindrical sidewall defining an axially extending slit, the axially extending slit extending from a first axial end portion of the cylindrical sleeve to a second axial end portion of the cylindrical sleeve.

13. The crosshead-piston rod assembly of claim 12, further comprising one or more annular members disposed circumferentially about the cylindrical sidewall and configured to retain the cylindrical sleeve about the piston rod neck at a fixed axial location.

14. The crosshead-piston rod assembly of claim 9, wherein the cylindrical sleeve is formed from a first semi-cylindrical sidewall portion and a second semi-cylindrical sidewall portion.

15. A crosshead-piston rod assembly, comprising:

a piston rod having a longitudinal axis and forming a piston rod neck and a piston rod shoulder, the piston rod comprising a first end integral or coupled with a piston head and a second end axially opposing the first end;

a crosshead comprising a main body portion defining a cavity and having a first end portion and a second end portion axially opposing the first end portion, the second end portion defining an opening through which a connecting rod extends from the cavity;

a flange having an inner surface defining a bore through which the second end of the piston rod and the piston rod neck extends, the flange coupled with the first end portion of the main body portion, and the inner surface formed from a first material having a Brinell hardness; and a cylindrical sleeve disposed circumferentially about the piston rod neck, the cylindrical sleeve formed from a second material having a lower Brinell hardness than the first material of the inner surface of the flange having a Brinell hardness, wherein:

the piston rod neck is disposed between the second end of the piston rod and the piston rod shoulder, the second end of the piston rod is coupled with the flange via a piston rod nut, and the piston shoulder abuts an axial end portion of the flange; and the flange defines a plurality of attachment apertures, and the flange is coupled with the first end portion of the main body portion via a plurality of fastening members, each fastening member being disposed within a respective attachment aperture of the plurality of attachment apertures.

* * * * *